United States Patent Office 2,701,382
Patented Feb. 8, 1955

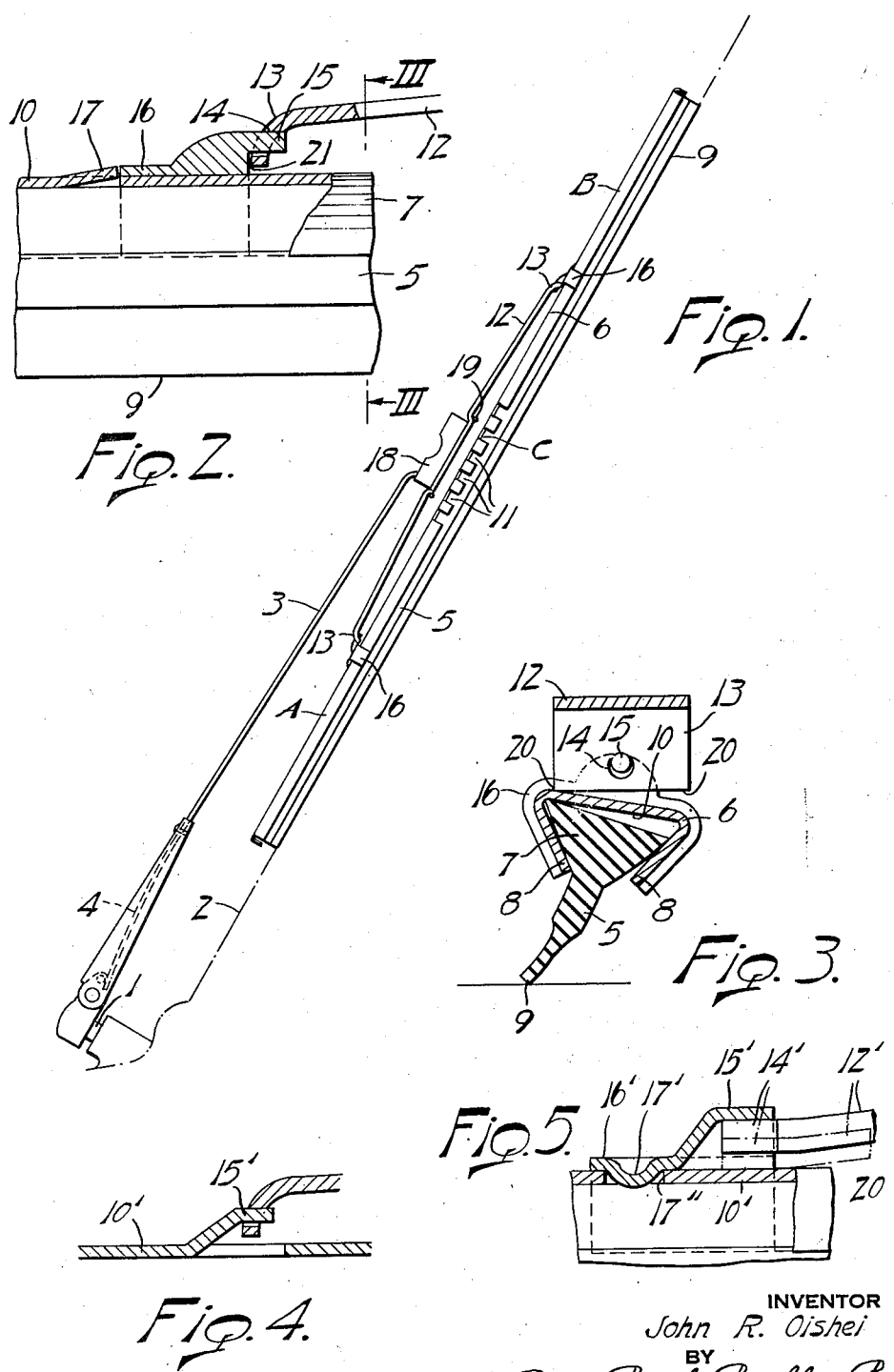

2,701,382

WINDSHIELD CLEANER

John R. Oishei, Buffalo, N. Y., assignor to Trico Products Corporation, Buffalo, N. Y.

Application May 13, 1949, Serial No. 93,163

2 Claims. (Cl. 15—245)

This invention relates to the windshield cleaning art and has particular reference to the wiping blade which is ordinarily carried by an actuating arm and moved back and forth upon the windshield surface for maintaining a definite field of vision therethrough.

The supposedly flat surface of a vehicle windshield is, as a matter of fact, not truly flat but rather embodies surface irregularities which cause a rigid wiping blade to fail in making uniform contact throughout the length of its wiping edge.

The primary object of the present invention is to provide a wiper which will give a perfect wipe and therefore will have a maximum cleaning efficiency.

A further object of the invention is to provide a wiper which will have its initial rocking action more readily controlled and its arm pressure more evenly distributed to its wiping edge to insure excellent performance in maintaining a clean field of vision.

Again, the invention has for its object to provide a wiper which possesses the advantages of a rigid straight blade while at the same time embodies a certain degree of flexibility for adapting it to surfaces of limited curvature.

The foregoing and other objects will manifest themselves as the following description progresses, reference being made therein to the accompanying drawing, wherein:

Fig. 1 is a side elevation showing a practical application of the improved blade;

Fig. 2 is a fragmentary longitudinal section through a portion of the blade;

Fig. 3 is a transverse sectional view about on line 3—3 of Fig. 2; and

Figs. 4 and 5 are fragmentary sectional views showing slightly modified forms of the invention.

Referring more particularly to the accompanying drawing, the numeral 1 designates the wiper actuating shaft journaled at the lower side of the windshield 2, carrying at its outer end the actuating arm 3 by which the wiper is oscillated or moved back and forth across the windshield surface, the arm being of suitable form and embodying a spring 4 for applying the wiping pressure to the blade.

The wiper or blade comprises a squeegee body 5 of elastic material and a channeled holder 6, the sides of which latter embrace the beaded or enlarged margin 7 of the strip-like or elongate flexible squeegee body. The cross-sectional shape of this margin is substantially triangular, by way of example, and therefore the side walls 8 of the channeled holder 6 converge downwardly over the enlarged margin 7 toward the wiping edge 9. Preferably the embrace of the side walls is rather loose so that the squeegee body may have a certain independent rocking action within the channel as the blade is moved back and forth over the windshield surface. By reason of the channeled shape of the holder, the latter is practically rigid throughout its length, the side walls 8 serving to reinforce and hold the transverse backing wall 10, which is substantially flat, against flexing.

In accordance with the present invention, a localized flexibility is incorporated in the channeled holder while still maintaining the integrity of the backing strip or wall 10. In the illustrated embodiment this is accomplished by reducing the side wall reinforcement, or by eliminating it entirely as by interrupting the side walls at a point or in a zone intermediate of their length. As depicted in Fig. 1, this is accomplished by providing one or more notches 11 which extend substantially throughout the width of each side wall so as to constitute the backing wall or strip 10 thereat as a hinge portion for joining or connecting the now separated rigid sections A and B. The wiping edge 9 which is continuous throughout the length of the blade thereby has its opposite end portions given solid support by the rigid and non-flexible sections A and B while midway of its length, or at the localized hinge portion, the wiping edge is given flexible support by the continuous and hinge forming portion of the backing wall 10.

A further important feature of the invention resides in the manner of distributing the arm pressure to these rigid sections A and B at points substantially midway of each section and longitudinally spaced from the hinge portion C. For this purpose a bridge or yoke 12 has its opposite ends connected to the sections A and B substantially midway of their length, and such connections are preferably of a pivotal or rocking character so as to provide a rockable point of support for each section at such midway location. This rockable support may be provided by turning downwardly the outer ends of the two arms constituting the bridge 12, as indicated at 13, and apertured to form bearings 14 in which the blade carried pintles 15 engage. The bearings 14 and pintles 15 provide cooperating bearing portions which extend lengthwise of the wiper so as to enable the blade to rock laterally for assuming its wiping position. Such pintles may be pressed from the back wall, such as is shown in Fig. 4, wherein the pintle 15' is struck from the back wall 10', or it may be formed on separate parts such as a retaining clasp 16 which is slid over the channeled holder and retained in position by an abutment 17 pressed from the wall 10. As shown in Fig. 5, the pintles 15" may be the opposite terminals of the yoke and pivot in bearings 14' in the clasps 16'. In lieu of the abutment, the clasp may be anchored by having an abutment or pimple 17' pressed therefrom into interlocking engagement with the wall of a recess 17" in the back wall 10". The blade is attached to the outer end of the arm as by the clip 18 which is preferably rigid with the bridge so as to localize the pivotal or rockable mountings 14, 15 at central points on the respective rigid sections A and B. The clip 18 is fixed in a suitable manner such as by riveting or swaging over lugs 19 protruding through apertures in the bridge.

The improved wiper is effective in cleaning well the windshield surface because the wiping pressure as imparted by the arm spring 4 is applied directly to the respective rigid sections close to the wiping edge portions. The arm attaching clip 18, being fixed on the bridge 12 against lateral rocking, receives the usual curved outer end of the arm 3 in a like manner and serves to constitute the bridge as a rigidly connected yieldable extension of the arm to provide a rocking support for the wiper close to the wiping edge. This enables the extent of rocking motion to be readily controlled. This has the further advantage of eliminating any weaving or twisting tendency of the blade about a central rockable mounting.

The downturned ends of the bridge are shaped to provide stop shoulders 20 which are alternately engaged by the rockable holder. This engagement determines the angular position assumed by the blade when being dragged by the arm over the glass surface. Sufficient clearance 21 may be provided between the downturned ends 13 and the back wall of the holder for this purpose. By reason of the rigidity of the sections A and B, the wiping pressure from the arm is uniformly distributed throughout the length of each section and, in addition, the urge is also applied to the suspended and uninterrupted backing wall 10. If desired, more than one localized flexible zone may be provided to increase the overall curvature which the blade may take, with the bridging member 12 having a like increase in the number of its arms through which the arm pressure is transmitted directly to the individual pivotal mountings of the several rigid sections as increased. The foregoing description has been given in detail for clearness and not by way of limitation since the inventive principles involved are capable of assuming other physical embodiments without departing from the spirit of the invention and the scope of the appended claims.

What is claimed is:

1. A wiper for flat windshield surfaces, comprising a holder having rigid end sections each of channel formation with means flexibly connecting their inner ends to maintain the channels in substantial alinement, an elongate flexible wiping member loosely arranged within the substantially alined channels of the rigid end sections for enabling self-adjusting wiping contact of the member with the surface being wiped, an elongate bridge connected at each end to a respective rigid end section for rocking of the latter about a longitudinal axis, the opposite ends of the bridge having longitudinally extending bearing portions, a retaining member mounted on the back of each rigid channeled section and having a longitudinally extending bearing portion engaged with a respective one of the first bearing portions to so connect the bridge and holder for such rocking, one of said retaining members being slidable longitudinally on its rigid section to effect engagement and disengagement of its associated bearing portions, and means securing said one retaining member against sliding to secure the bearing portions operative.

2. A windshield wiper comprising, an elongate continuous flexible blade body having a wiping edge along one longitudinal margin and an anchoring enlargement along its opposite longitudinal margin, an elongate holder unit for said blade body comprising two rigid channel sections loosely embracing said anchoring enlargement for limited lateral rocking of said blade body within said rigid sections and a laterally substantially rigid intermediate hinge-forming section permitting such lateral rocking of said blade body and flexibly joining the adjacent ends of said rigid sections for lateral rocking thereof as a unit while enabling individual surface-conforming adjustment thereof in a direction substantially normal to the windshield surface, pressure-distributing bridge means spanning said intermediate holder section and adapted for connection to an actuating arm, and means loosely connecting the opposite ends of said bridge means to said rigid sections substantially midway of the length thereof for limited lateral rocking of said holder unit relative to said bridge means.

References Cited in the file of this patent

UNITED STATES PATENTS

| | | |
|---|---|---|
| 1,463,590 | Pederson | July 31, 1923 |
| 1,694,245 | Baker | Dec. 4, 1928 |
| 1,779,344 | Tarver | Oct. 21, 1930 |
| 2,179,451 | Horton | Nov. 7, 1939 |
| 2,254,343 | Zierer | Sept. 2, 1941 |
| 2,303,694 | Horton | Dec. 1, 1942 |
| 2,306,946 | Horton | Dec. 29, 1942 |

FOREIGN PATENTS

| | | |
|---|---|---|
| 427,383 | Great Britain | Apr. 23, 1935 |
| 820,156 | France | July 26, 1937 |